R. C. ELDRIDGE & J. WILLERS.
ANIMAL TRAP.
APPLICATION FILED SEPT. 30, 1912.
1,115,793.
Patented Nov. 3, 1914.
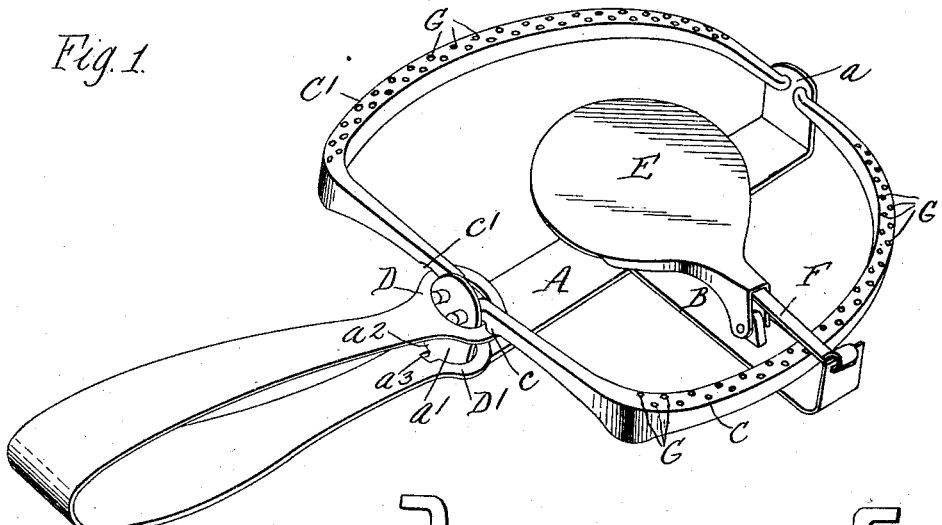
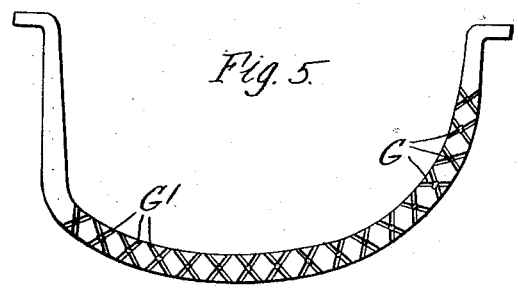
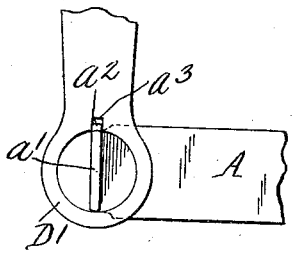
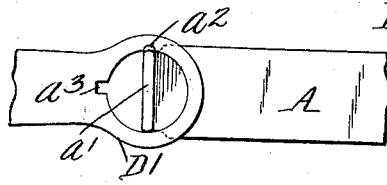
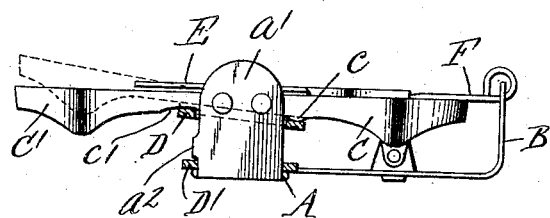
Witnesses.
A. Borkenhagen
A. G. Demond
Inventors.
Reuben C. Eldridge,
Julius Willers
By Wilhelm, Parker & Hurd,
Attorneys.

UNITED STATES PATENT OFFICE.

REUBEN C. ELDRIDGE, OF NIAGARA FALLS, ONTARIO, CANADA, AND JULIUS WILLERS, OF NIAGARA FALLS, NEW YORK; SAID WILLERS ASSIGNOR TO SAID ELDRIDGE.

ANIMAL-TRAP.

1,115,793. Specification of Letters Patent. Patented Nov. 3, 1914.

Application filed September 30, 1912. Serial No. 723,019.

*To all whom it may concern:*

Be it known that we, REUBEN C. ELDRIDGE, a subject of the King of Great Britain, residing at Niagara Falls, in the Province of Ontario, in the Dominion of Canada, and JULIUS WILLERS, a citizen of the United States, residing at Niagara Falls, in the county of Niagara and State of New York, have invented a new and useful Improvement in Animal-Traps, of which the following is a specification.

This invention relates to improvements in animal traps of that kind known as steel traps, having two pivoted spring actuated jaws which are adapted, when the trap is sprung by an animal, to close upon and grasp a leg or other member of the animal. The jaws of these traps are usually held open or set by a dog or latch which positively holds one of the jaws against movement by the spring, but leaves the other jaw resting loosely in the open position upon the spring. Holding down one side of the spring by one of the jaws in this way tends to twist the spring and elevate the other side thereof, so that the free jaw resting on the elevated side of the spring is supported in an inclined or higher position, thereby enabling the animal to spring the trap from underneath the free jaw and avoid being caught. As ordinarily constructed heretofore, the jaws of the traps have either been made with toothed or smooth holding edges or faces, but both of these constructions are objectionable. The toothed edges often sever the member caught while the animal can pull its member from between the smooth jaws, either construction thus permitting the escape of the animal.

The objects of this invention are to produce a steel trap which will overcome these defects and which is so constructed that when the trap is set, both jaws will be wide open or lie substantially in the same horizontal plane; also to provide the jaws with indented or recessed holding faces which will not lacerate or cut the member caught thereby, but will nevertheless firmly secure the animal and prevent its escape; also to simplify and improve the construction of traps of this kind in the other respects hereinafter specified.

In the accompanying drawings: Figure 1 is a perspective view of a steel trap embodying the invention showing the same in its set position. Figs. 2 and 3 are fragmentary plan views thereof on an enlarged scale showing the manner of securing the lower leg of the spring to the base or bottom of the trap. Fig. 4 is an end elevation, partly in section, of the trap in its set position. Fig. 5 is a face view of a jaw of modified construction.

Like reference characters refer to like parts in the several figures.

The trap comprises, as usual, a base or bottom A, having a cross arm B extending laterally therefrom; jaws C C' which are pivoted on the base; a bent actuating spring which comprises upper and lower legs having end loops D D' which embrace the jaws and the pivot post therefor at one end of the base; a bait pan E; and a dog or latch F which is pivoted on the cross arm B and is adapted to pass over one of the jaws and be releasably engaged by the bait pan for holding the jaws open. These parts, except as hereinafter specified, may be of the usual or any suitable construction.

The base A of the trap is preferably made of a single piece of metal having upwardly bent ends which form the pivot posts $a$ $a'$ for the jaws. The usual separate piece pivot post, riveted to the base at the spring end of the jaws, is thus replaced by the upturned end $a'$ of the base, thereby avoiding the expense of the riveted construction and producing a strong, rigid and durable trap.

In order to hold the lower leg of the spring horizontal or parallel with the base, the pivot post $a'$ is provided at the side thereof farthest from the dog F, with a shoulder or lug $a^2$ which overhangs and holds down the adjacent side of the loop D' of the lower leg of the spring. To allow the loop to be slipped into position over the shoulder $a^2$, a slot $a^3$ of sufficient size for the passage of the shoulder is formed in the loop D'. By turning the spring to a position at right angles to the base A, the shoulder will register with and can be passed through the slot $a^3$ when the end $a'$ of the base is inserted into the loop D' of the lower leg of the spring. Then by turning the spring so that the shoulder and recess are out of alinement, the shoulder acts to hold the lower leg of the spring down on the base A.

When the trap is set the jaw C, which is held by the dog, bears down on the underlying side of the upper leg of the spring and thereby tends to tilt the spring and raise the opposite side of the lower leg of the spring, but this is prevented by the shoulder $a^2$ which bears against and holds this leg in a position parallel with the base. Since the free jaw C', when open, merely rests loosely on the upper leg of the spring at one side of the pivot post $a'$ and has no effect in holding the spring compressed, the pressure of the other jaw C on the upper leg of the spring at the opposite side of the pivot post twists or tilts this leg of the spring to the inclined position shown in Fig. 4, and, unless prevented, this will hold the free jaw in the inclined position, indicated by dotted lines in Fig. 4, instead of permitting it to lie in the same horizontal plane with the other jaw. This is prevented by providing the jaw C with a slight offset protuberance or lug $c$ located so as to bear against the spring. This lug projects downwardly from the jaw when the trap is set and depresses the upper leg of the spring sufficiently to compensate for any twist in the spring and thereby allows the jaw C' to descend to the horizontal plane of the other jaw C when the trap is set. In addition to providing the lug $c$ on the jaw C, the free jaw is preferably notched or recessed at $c'$ where it engages the spring, so that it is not necessary to make the lug protrude as far as otherwise would be necessary. This construction does not add to the number of parts or complication of the trap, nor increase the cost of manufacture of the same and insures the proper positioning of the jaws when the trap is set, thereby increasing its efficiency.

The gripping faces of the jaws are preferably provided with indentations or recesses which are adapted to prevent a captured animal from pulling the entrapped member from between the jaws, either in a direction transversely or lengthwise thereof. In traps of this kind having only a single spring acting on the jaws at one end thereof, the other ends of the jaws are not so firmly pressed together and it frequently happens that a captured animal escapes by drawing the entrapped member lengthwise of the jaws to the end thereof remote from the spring, which is the natural direction for it to struggle to free itself on account of the trap being secured by a chain or other fastening at the spring end. In the construction shown in Fig. 1 a plurality of small shallow hollows or indentations G are formed in the gripping faces of the jaws for this purpose, and in the construction shown in Fig. 5, cross grooves G', extending diagonally across the faces of the jaws, are employed for the same purpose. The member gripped between the jaws becomes inflamed and swells, thus causing the flesh of the animal to be pressed into these indentations or grooves and makes it practically impossible for the animal to withdraw the entrapped member, either lengthwise or transversely of the jaws. The flat faced indented or recessed jaws will not cut or sever the entrapped member, as will toothed jaws, but they insure a much firmer and securer hold than smooth faced jaws, or even jaws provided with continuous longitudinal grooves.

We claim as our invention:

1. In an animal trap, the combination of a base having integral upturned ends, jaws pivoted to said upturned ends of the base, a spring for actuating said jaws having a loop through which one of said upturned ends of the base extends, means engaging one of said jaws for releasably holding said jaws open, and a shoulder on the upturned end of said base at the side thereof opposite to said holding means for holding the loop substantially parallel with the base, said loop being of a shape adapting it to be slipped over said upturned end when the spring is in one position relatively to the base and to be held parallel to the base by said shoulder when the spring is in another position relatively to the base, substantially as set forth.

2. In an animal trap, the combination of a base having integral upturned ends, jaws pivoted to said upturned ends of the base, a spring for actuating said jaws having a loop through which one of said upturned ends of the base extends, means engaging one of said jaws for releasably holding said jaws open, and a shoulder on the upturned end of said base at the side thereof opposite to said holding means for holding the loop substantially parallel with the base, said loop having a slot through which said shoulder is adapted to pass in one position of the spring, and being held parallel to the base by the shoulder when the spring is in a position in which said slot and shoulder are out of alinement, substantially as set forth.

3. In an animal trap, the combination of a base, pivot posts extending upwardly from the base, jaws pivoted on said pivot posts, a U-shaped spring for actuating said jaws having end loops through which one of said pivot posts is adapted to extend, means for releasably holding one of said jaws open against the action of said spring, and a shoulder on said pivot post on the side thereof opposite to said holding means adapted to overhang one of said loops for holding the same down parallel with said base, the other jaw in its open position resting loosely on said spring, said first mentioned jaw having a protruding portion adapted to engage said spring so as to depress said spring far enough to compensate for the twisting of the spring, whereby the two jaws will lie substantially on the same plane when the trap is set, substantially as set forth.

Witness our hands this 23rd day of September, 1912.

REUBEN C. ELDRIDGE.
JULIUS WILLERS.

Witnesses:
EVELYN ELDRIDGE,
L. C. ELDRIDGE.

Copies of this patent may be obtained for five cents each, by addressing the "Commissioner of Patents, Washington, D. C."